US012597040B2

(12) United States Patent  
Warren et al.

(10) Patent No.: US 12,597,040 B2  
(45) Date of Patent: Apr. 7, 2026

(54) SHARED CHECKLISTS FOR ONBOARD ASSISTANT

(71) Applicant: GM Cruise Holdings LLC, San Francisco, CA (US)

(72) Inventors: Christopher Warren, Seattle, WA (US); MinJie Tong, Issaquah, WA (US); Theresa Foy, San Francisco, CA (US); Ashley Sams, San Francisco, CA (US); Soleil Phan, San Francisco, CA (US); Leah Meyerholtz, San Francisco, CA (US); David J. Shuckerow, Seattle, WA (US); Daniel Paul Thengvall, San Francisco, CA (US); Qingxuan Li, San Mateo, CA (US); Steven Sturkop, Villeneuve Loubet (FR)

(73) Assignee: GM Cruise Holdings LLC, San Francisco, CA (US)

( * ) Notice: Subject to any disclaimer, the term of this patent is extended or adjusted under 35 U.S.C. 154(b) by 338 days.

(21) Appl. No.: 17/869,460

(22) Filed: Jul. 20, 2022

(65) Prior Publication Data

US 2024/0029077 A1 Jan. 25, 2024

Related U.S. Application Data

(63) Continuation of application No. 17/869,051, filed on Jul. 20, 2022, now abandoned.

(51) Int. Cl.  
*G06Q 30/016* (2023.01)  
*B60W 40/08* (2012.01)  
(Continued)

(52) U.S. Cl.  
CPC ........... *G06Q 30/016* (2013.01); *B60W 40/08* (2013.01); *B60W 60/001* (2020.02);  
(Continued)

(58) Field of Classification Search  
CPC ... G06Q 30/016; G06Q 30/015; B60W 40/08; B60W 60/001; B60W 2540/01; G05D 1/0088  
See application file for complete search history.

(56) References Cited

U.S. PATENT DOCUMENTS 11,370,391 B1* 6/2022 Gammelgard ....... G05D 1/0287  
2019/0101914 A1* 4/2019 Coleman, II ......... G08G 1/0104  
(Continued)

*Primary Examiner* — Anne Marie Antonucci  
*Assistant Examiner* — Luis G Del Valle  
(74) *Attorney, Agent, or Firm* — Honigman LLP; Matthew H. Szalach; Jonathan P. O'Brien

(57) ABSTRACT

There is disclosed herein a method of providing customer service, including receiving a customer service request from an autonomous vehicle (AV), the customer service request comprising sensor data collected by the AV; selecting a standard operating procedure (SOP) for responding to the customer service request, the SOP selected from a data store comprising a plurality of SOPs, wherein selecting the SOP is based at least in part on the sensor data from the AV, and wherein the SOP includes a human-usable resolution script; and handling the customer service request, including displaying the human-usable resolution script to a human customer service agent to assist the human customer service agent in handling the customer service request.

18 Claims, 8 Drawing Sheets

(51) Int. Cl.
*B60W 60/00* (2020.01)
*G05D 1/00* (2024.01)
*G06Q 30/015* (2023.01)

(52) U.S. Cl.
CPC ......... *G05D 1/0088* (2013.01); *G06Q 30/015* (2023.01); *B60W 2540/01* (2020.02)

(56) References Cited

U.S. PATENT DOCUMENTS

2020/0175428 A1* 6/2020 Mercay ................ G05D 1/0291
2021/0174102 A1* 6/2021 Weissert ............. B60R 16/0231
2021/0191398 A1* 6/2021 Chen .................... G05D 1/0022
2021/0390491 A1* 12/2021 Ellison ............... G10L 15/1807
2022/0089237 A1* 3/2022 Sverdlov ............... B25J 9/1697

* cited by examiner

700

START

704
RECEIVE INCOMING CUSTOMER SERVICE INSTANCE

708
LOOKUP CORRECT SOP

712
EXECUTE SOP AND DISPLAY STEPS TO AGENT

724
RESOLVE ISSUE

796
DONE

SHARED CHECKLISTS FOR ONBOARD ASSISTANT

CROSS REFERENCE TO RELATED APPLICATION

This application is a continuation (and claims benefit of priority under 35 U.S.C. § 120) of U.S. application Ser. No. 17/869,051, filed Jul. 20, 2022, entitled "SHARED CHECKLISTS FOR ONBOARD ASSISTANT." The disclosure of this prior application is considered part of (and is incorporated by reference in) the disclosure of this application.

FIELD OF THE SPECIFICATION

The present disclosure relates generally to autonomous vehicles (AVs), and more particularly, though not exclusively, to shared checklists for onboard assistants in an autonomous vehicle (AV).

BACKGROUND

AVs, also known as self-driving cars, driverless vehicles, and ridehail vehicles, are vehicles that use multiple sensors to sense the environment and move without human input. Automation technology in the AVs enables the vehicles to drive on roadways and to perceive the vehicle's environment accurately and quickly, including obstacles, signs, and traffic lights. The vehicles may be used to pick up passengers and drive the passengers to selected destinations. The vehicles may also be used to pick up packages and/or other goods and deliver the packages and/or goods to selected destinations.

SUMMARY

There is disclosed herein a method of providing customer service, including receiving a customer service request from an autonomous vehicle (AV), the customer service request comprising sensor data collected by the AV; selecting a standard operating procedure (SOP) for responding to the customer service request, the SOP selected from a data store comprising a plurality of SOPs, wherein selecting the SOP is based at least in part on the sensor data from the AV, and wherein the SOP includes a human-usable resolution script; and handling the customer service request, including displaying the human-usable resolution script to a human customer service agent to assist the human customer service agent in handling the customer service request.

BRIEF DESCRIPTION OF THE DRAWINGS

The present disclosure is best understood from the following detailed description when read with the accompanying FIGURES. In accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

DETAILED DESCRIPTION

Overview

Figure 1:
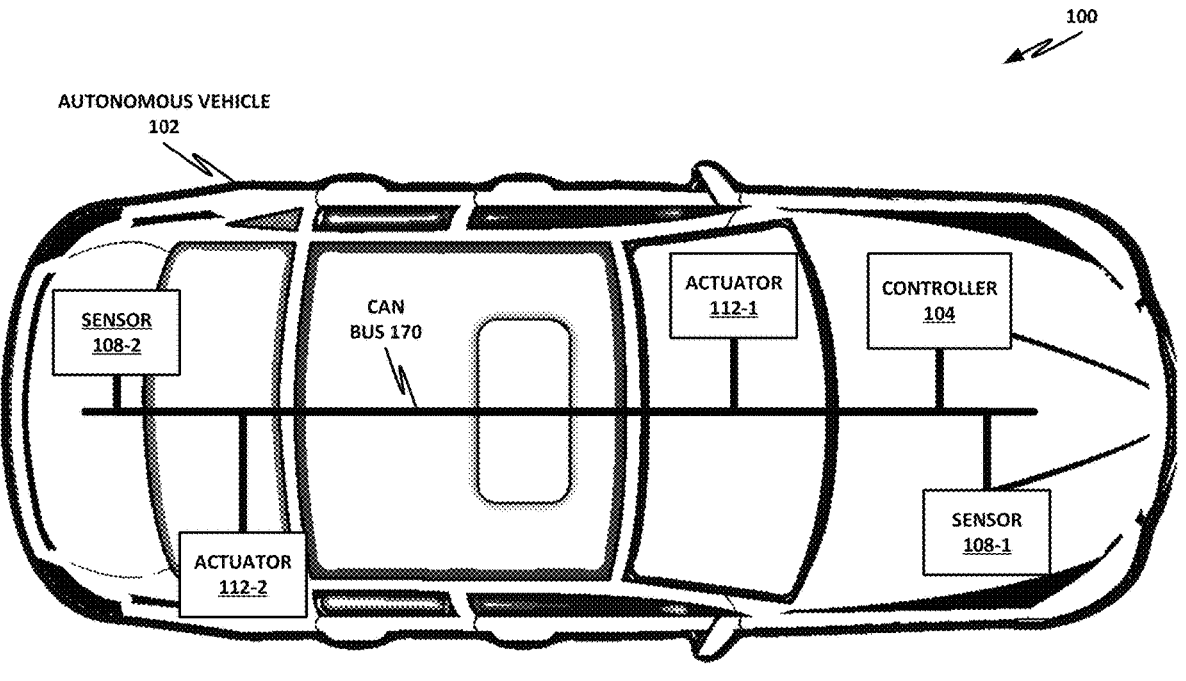
FIG. 1 is a block diagram of selected elements of an AV system.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

AVs and vehicles with semiautonomous features like automatic driver assist systems (ADAS) may include premium features, such as an onboard assistant. Onboard assistants are currently found in existing human-operated vehicles, and are more common in higher-end vehicles.

Onboard assistants may handle a range of user interactions, including emergency and non-emergency situations. For example, an onboard assistant may provide a button that a driver or passenger may press to be placed in contact with a customer service center. Customer service agents may then speak with the driver or passenger and help address issues or resolve concerns. The onboard assistant may also receive sensor data from the vehicle, and in certain situations may automatically place a call. For example, a call may be placed automatically in the case of a collision, mechanical failure, law enforcement interaction (e.g., the car was pulled over), obstruction, dangerous weather conditions, or similar. One use case of an AV includes operating a fleet of ridehail vehicles. These may be ride share vehicles that operate without a human driver. An end user passenger may install a mobile app on his or her cellular phone or mobile device and may provide profile and/or billing. Depending on the passenger's privacy preferences, he or she may share additional information that may be used to customize or personalize the ride experience. When the end user needs to go somewhere, he or she may use the ride share app to request a ride with a ridehail vehicle, including a desired destination. The AV operator may have a fleet of ridehail vehicles and may dispatch a ridehail vehicle to the end user's destination to pick the passenger up and take him or her to the desired destination.

In the context of a ridehail vehicle service, an onboard assistant may assume additional significance. As ridehail vehicle services are new, many users may initially find it unsettling to ride in a car without a human operator, and that may in fact lack human driving equipment altogether (e.g., it may lack a steering wheel, accelerator, brake pedals, etc.) In these cases, the onboard assistant may constitute the sole or at least primary person-to-person interaction for the passenger.

In the case of a ridehail vehicle, the AV may include an instrumentation suite. In addition to the instruments required to operate the AV, there may be a user interface, such as a touch screen "tablet" that the human passenger may operate during the ride. Alternatively, an app installed on the user's mobile device may operate as the user interface during the trip. The user interface may provide entertainment options, such as music, video, games, trip information, GPS displays, and others. It may also provide a "soft" button to engage the onboard assistant, such as by placing a call to a customer service agent. The AV may include speakers, microphones, and cameras, and/or monitors. These devices may provide the passenger with a full audio-video conference call with a customer service agent or other agent of the AV operator, or with the user's own contacts, with emergency services personnel, or others. In some cases, new passengers may wish to operate the onboard assistant simply to reassure himself or herself that there is a human being on the other end.

AVs may also be used for many other purposes, including by way of illustrative and non-limiting example, personal vehicles (which may be fully autonomous, or provide hybrid autonomous/driver assist modes), automated cargo vehicles, delivery drones, autonomous trains, autonomous aircraft, or similar. Any such vehicle may benefit from an onboard assistant as described in this specification.

One feature of the onboard assistant is to be able to respond to a user button press or to respond to automated calls that are driven by sensor data within the AV. In either case, the AV may push to the customer service operations center contextual and state data about the AV, the occupancy of the AV, the passenger or passengers, and other information that may be useful in assessing and/or resolving the customer service incident.

On the back end, the customer service representative may have a display, such as a graphical user interface or a web interface, that may disclose to the customer service operative relevant information about the call. The display may include the raw sensor data provided by the AV, or the sensor data may be filtered, transformed, and/or conditioned to make it more easily usable by the customer service agent.

Embodiments may include AV state, occupancy sensors, and predictions that may be displayed to the customer service operative. These data may be displayed to the customer service operative and may also be used to predict which tasks should be automatically pushed to the operator supporting the AV. Different sensor states may be correlated to particular standard operating procedures (SOP) that may be associated with various resolutions. For example, the customer service center may have an SOP for dealing with a mechanical failure, a flat tire, an obstruction, a dangerous situation within the vehicle, a law enforcement interaction, or other conditions that may require customer service intervention.

In some cases, it is straightforward to correlate a sensor reading with a root cause and a corresponding SOP. For example, if the only anomalous sensor reading is low pressure below a threshold in one of the tires, then it may be straightforward to diagnose that the tire is flat and needs to be repaired or replaced. It may therefore be straightforward to correlate that simple event to an SOP for handling a flat tire.

In other embodiments, it may be less simple or straightforward to correlate anomalous sensor readings with an appropriate SOP. With so many sensors in the AV that may correspond to a large set of root causes, it may be nontrivial to determine what is the root cause that drove the customer service instance and which SOP should be used to handle it. Sensor data may include not only internal sensors of the AV, such as tire pressure, speed, direction, destination, temperature sensors on various components, electrical integrity or data integrity signals, or similar, but also customer sentiment as may be inferred from sensors, such as microphones, cameras, and other sensors that may be used to measure customer sentiment. Sensor data may also include data collected from third-party sources, such as third-party news, weather, and/or traffic services. There may be any number of SOPs stored in an SOP database that have been reviewed, certified, and curated by human customer service experts. However, selecting the correct SOP for a particular situation may be nontrivial.

In embodiments, a machine learning engine may be used to analyze various sensor inputs and correlate those inputs to a set of SOPs in an SOP database. The machine learning algorithm may be trained on a large set of sensor inputs with a particular correct SOP selected for each sensor set. The machine learning (ML) algorithm may then correlate this to real-world examples where the algorithm selects an appropriate SOP response based on the sensor inputs. The selected SOP may then be displayed to a customer service agent handling the customer service incident as initiated by a human button press or by an automated sensor detection.

AV state and interior sensors may thus enable the AV to ask for the type of help that it needs from the right operator. Help may go beyond simple driving assistance, which may already be provided by remote assistance. Data such as the AV state, occupancy, window or door state, customer sentiment, weather conditions, obstructions, data integrity, or others may be used to select an appropriate SOP.

When the AV detects that something is wrong or the passenger calls in, there may be a set of (causal) triggers that map to the cause of the issue that may be displayed to the operator handling the case or call. The operator may know immediately what is wrong, and what type of response is needed for the incident. The AV state, passenger state, cabin state, and other sensory data may automatically be mapped to a set of responses and SOPs. These may then be provided to the remote operator for the right type of troubleshooting when the AV determines that something is wrong.

The foregoing may be used to build or embody several example implementations, according to the teachings of the present specification. Some example implementations are included here as non-limiting illustrations of these teachings.

DETAILED DESCRIPTION OF THE DRAWINGS

A system and method for providing shared checklists for an onboard assistant will now be described with more particular reference to the attached FIGURES. It should be noted that throughout the FIGURES, certain reference numerals may be repeated to indicate that a particular device or block is referenced multiple times across several FIG-URES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram 100 illustrating an example AVs 102. AVs 102 may be, for example, an automobile, car, truck, bus, train, tram, funicular, lift, or similar. AVs 102 could also be an autonomous aircraft (fixed wing, rotary, or tiltrotor), ship, watercraft, hover craft, hydrofoil, buggy, cart, golf cart, recreational vehicle, motorcycle, off-road vehicle, three- or four-wheel all-terrain vehicle, or any other vehicle. Except to the extent specifically enumerated in the appended claims, the present specification is not intended to be limited to a particular vehicle or vehicle configuration.

In this example, AVs 102 includes one or more sensors, such as sensor 108-1 and sensor 108-2. Sensors 108 may include, by way of illustrative and non-limiting example, localization and driving sensors such as photodetectors, cameras, radio direction and ranging (RADAR), sound navigation and ranging (SONAR), light detection and ranging (LIDAR), GPS, inertial measurement units (IMUS), synchros, accelerometers, microphones, strain gauges, pressure monitors, barometers, thermometers, altimeters, wheel speed sensors, computer vision systems, biometric sensors for operators and/or passengers, or other sensors. In some embodiments, sensors 108 may include cameras implemented using high-resolution imagers with fixed mounting and field of view. In further examples, sensors 108 may include LIDARs implemented using scanning LIDARs. Scanning LIDARs have a dynamically configurable field of view that provides a point-cloud of the region intended to scan. In still further examples, sensors 108 includes RADARs implemented using scanning RADARs with dynamically configurable field of view.

AVs 102 may further include one or more actuators 112. Actuators 112 may be configured to receive signals and to carry out control functions on AVs 102. Actuators may include switches, relays, or mechanical, electrical, pneumatic, hydraulic, or other devices that control the vehicle. In various embodiments, actuators 112 may include steering actuators that control the direction of AVs 102, such as by turning a steering wheel, or controlling control surfaces on an air or watercraft. Actuators 112 may further control motor functions, such as an engine throttle, thrust vectors, or others. Actuators 112 may also include controllers for speed, such as an accelerator. Actuators 112 may further operate brakes, or braking surfaces. Actuators 112 may further control headlights, indicators, warnings, a car horn, cameras, or other systems or subsystems that affect the operation of AVs 102.

A controller 104 may provide the main control logic for AVs 102. Controller 104 is illustrated here as a single logical unit and may be implemented as a single device such as an electronic control module (ECM) or other. In various embodiments, one or more functions of controller 104 may be distributed across various physical devices, such as multiple ECMs, one or more hardware accelerators, artificial intelligence (AI) circuits, or other.

Controller 104 may be configured to receive from one or more sensors 108 data to indicate the status or condition of AVs 102, as well as the status or condition of certain ambient factors, such as traffic, pedestrians, traffic signs, signal lights, weather conditions, road conditions, or others. Based on these inputs, controller 104 may determine adjustments to be made to actuators 112. Controller 104 may determine adjustments based on heuristics, lookup tables, AI, pattern recognition, or other algorithms.

Various components of AVs 102 may communicate with one another via a bus such as controller area network (CAN) bus 170. CAN bus 170 is provided as an illustrative embodiment, but other types of buses may be used, including wired, wireless, fiberoptic, infrared, WiFi, Bluetooth, dielectric waveguides, or other types of buses. Bus 170 may implement any suitable protocol. For example, in some cases bus 170 may use transmission control protocol (TCP) for connections that require error correction. In cases where the overhead of TCP is not preferred, bus 170 may use a one-directional protocol without error correction, such as user datagram protocol (UDP). Other protocols may also be used. Lower layers of bus 170 may be provided by protocols such as any of the family of institute of electrical and electronics engineers (IEEE) 802 family of communication protocols, including any version or subversion of 802.1 (higher layer local area network (LAN)), 802.2 (logical link control), 802.3 (Ethernet), 802.4 (token bus), 802.5 (token ring), 802.6 (metropolitan area network), 802.7 (broadband coaxial), 802.8 (fiber optics), 802.9 (integrated service LAN), 802.10 (interoperable LAN security), 802.11 (wireless LAN), 802.12 (100VG), 802.14 (cable modems), 802.15 (wireless personal area network, including Bluetooth), 802.16 (broadband wireless access), or 802.17 (resilient packet ring) by way of illustrative and non-limiting example. Non-IEEE and proprietary protocols may also be supported, such as for example, InfiniBand, FibreChannel, FibreChannel over Ethernet (FCoE), Omni-Path, Lightning bus, or others. Bus 170 may also enable controller 104, sensors 108, actuators 112, and other systems and subsystems of AVs 102 to communicate with external hosts, such as internet-based hosts. In some cases, autonomous vehicle 102 may form a mesh or other cooperative network with other AVs, which may allow sharing of sensor data, control functions, processing ability, or other resources.

Figure 8:
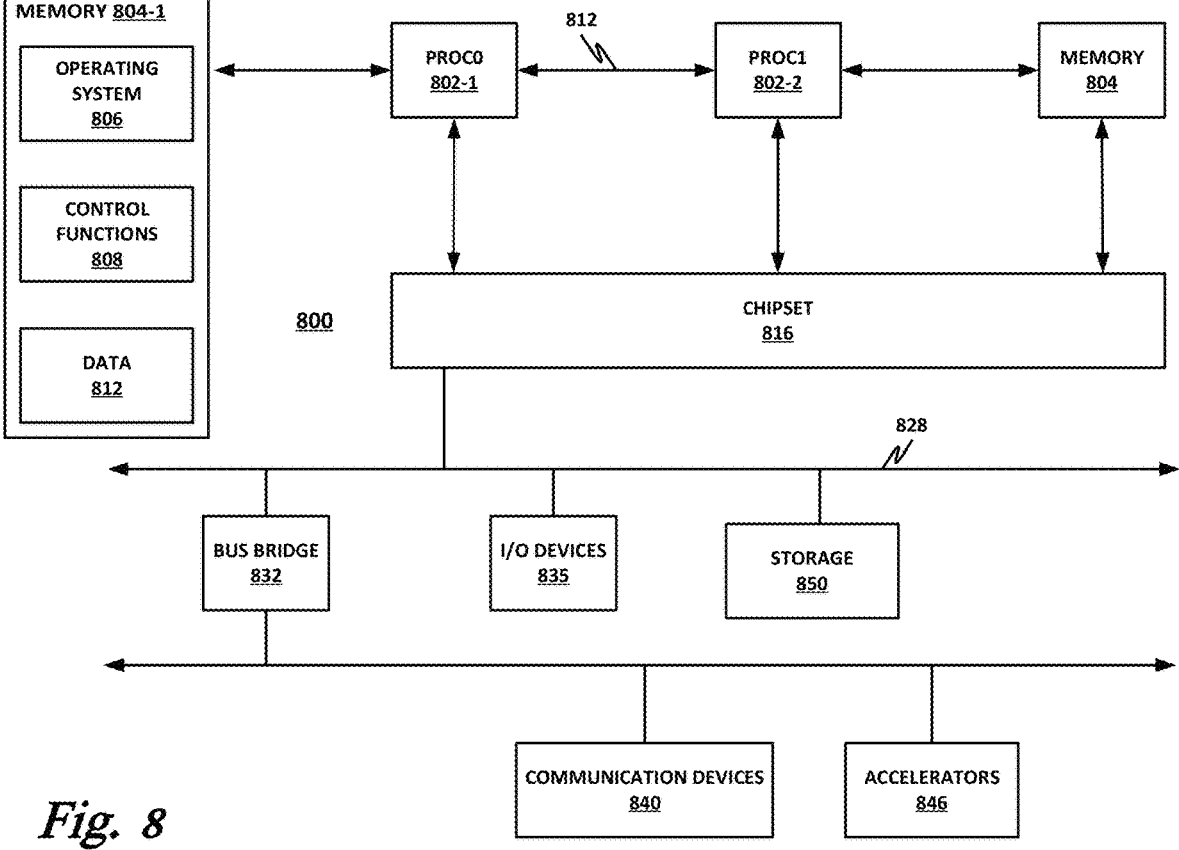
FIG. 8 is a block diagram of selected elements of a hardware platform.

Controller 104 may control the operations and functionality of AVs 102, or one or more other AVs. Controller 104 may receive sensed data from sensors 108, and make onboard decisions based on the sensed data. In some cases, controller 104 may also offload some processing or decision making, such as to a cloud service or accelerator. In some cases, controller 104 is a general-purpose computer adapted for I/O communication with vehicle control systems and sensor systems. Controller 104 may be any suitable computing device. An illustration of a hardware platform is shown in FIG. 8, which may represent a suitable computing platform for controller 104. In some cases, controller 104 may be connected to the internet via a wireless connection (e.g., via a cellular data connection). In some examples, controller 104 is coupled to any number of wireless or wired communication systems. In some examples, controller 104 is coupled to one or more communication systems via a mesh network of devices, such as a mesh network formed by AVs.

According to various implementations, AVs 102 may modify and/or set a driving behavior in response to parameters set by vehicle passengers (e.g., via a passenger interface) and/or other interested parties (e.g., via a vehicle coordinator or a remote expert interface). Driving behavior of AVs may be modified according to explicit input or feedback (e.g., a passenger specifying a maximum speed or a relative comfort level), implicit input or feedback (e.g., a passenger's heart rate), or any other suitable data or manner of communicating driving behavior preferences.

AVs 102 is illustrated as a fully autonomous automobile but may additionally or alternatively be any semiautonomous or fully autonomous vehicle. In some cases, autonomous vehicle 102 may switch between a semiautonomous state and a fully autonomous state and thus, some AVs may have attributes of both a semiautonomous vehicle and a fully autonomous vehicle depending on the state of the vehicle.

Figure 2:
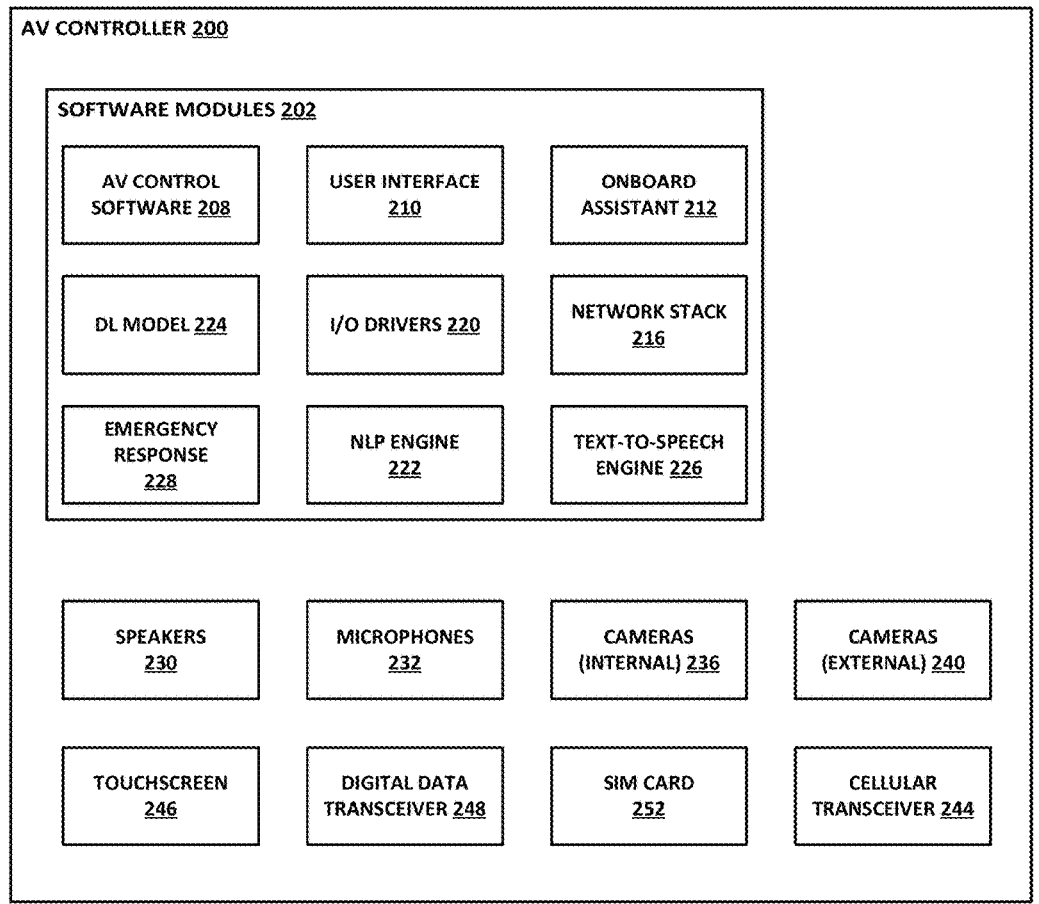
FIG. 2 is a block diagram of selected elements of an AV controller.

FIG. 2 is a block diagram of selected elements of an AV controller 200. Elements disclosed here are selected to illustrate operative principles of the present disclosure. Embodiments may include elements other than those disclosed here, and embodiments need not necessarily include all elements disclosed here.

AV controller 200 may be based on a hardware platform. The hardware platform may include a processor, memory, and other elements to provide the hardware infrastructure for AV controller 200. Examples of additional selected elements of a hardware platform are illustrated in FIG. 8 below.

AV controller 200 may include several peripheral devices that assist the AV controller in performing its function. These may include, by way of illustrative and non-limiting example, speakers 230, microphones 232, internal cameras 236. External cameras 240, touchscreen 246, digital data transceiver 248, subscriber identity module (SIM) card 252, and cellular transceiver 244.

Speakers 230 may be located internally and/or externally to the cabin of the vehicle and may be used to provide audible feedback to an occupant of the cabin of the cabin, or to people outside the vehicle. Microphones 232 may also be disposed within or without the vehicle and may be used to pick up audible cues from the environment. For example, microphones 232 may be used to detect speech, to monitor the environment, or to hear sounds such as sirens, horns, disturbances, or similar.

Internal cameras 236 may be used to monitor the interior of the vehicle, such as to monitor activity of occupants of the cabin of the vehicle. External cameras 240 may be used to monitor the external environment. External cameras 240 may be an integral part of the autonomous operation, which may rely in part on computer vision to identify visual elements of the external environment. These sensors may enable the AV controller software to provide autonomous or semiautonomous control of the vehicle.

Touchscreen 246 may provide an I/O interface for an occupant or passenger of the vehicle. Touchscreen 246 may be similar to a tablet, and may be a standalone device, or may be integrated into the AV as a fixture. In the same or a different embodiment, touchscreen 246 may be provided by a mobile device, laptop computer, or other device owned and provided by the passenger. Touchscreen 246 may provide a facility for the passenger to type messages, send texts, view maps, play games, communicate with the vehicle, communicate with customer service, or perform other actions that may be useful to the passenger or occupant.

Digital data transceiver 248, SIM card 252, and cellular transceiver 244 may form a communication suite. For example digital data transceiver 248 may provide a network interface to a digital data service, such as a long-term evolution (LTE) fourth-generation (4G) service, a fifth-generation (5G) service, or some other similar wired or wireless digital data service. Digital data transceiver 248 may communicatively couple AV controller 200 the internet or to other network services. SIM card 252 may operate with cellular transceiver 244 to provide voice communication via cellular communication networks. Sim card 252 provides a unique identity on the cellular network and may provide for example a phone number or other identifier for AV controller

200. Cellular transceiver 244 may include the hardware, software, and firmware elements to provide communication with a voice-based cellular communication network.

In embodiments, cellular transceiver 244 may be either a digital or an analog cellular network connection. In the case of a digital connection, cellular transceiver 244 may digitize voice communications and optionally compress data before sending the data over the cellular network.

AV controller 200 may also include a plurality of software modules 202. Software modules 202 may run on an operating system, such as an embedded or real-time operating system provided by AV controller 200. Software modules 202 provide various functions and facilities and may interact with appropriate hardware elements in performing their functions. The division of software elements within software modules 202 is provided as a logical division and is not necessarily representative of a physical division. In some cases, various software modules may run as dedicated services or microservices on AV controller 200 and may be isolated or sandboxed from one another. In other cases, some software modules may be bundled into a single physical or logical software module. Other configurations are possible.

AV control software 208 may include the primary logic for operating the AV. In the case that AV is fully autonomous (e.g., "L4" or higher, as defined by the society of automotive engineer (SAE)), AV control software 208 may have full control of the vehicle. In that case, a passenger or occupant of the vehicle may have no access to controls such as the accelerator or steering wheel. The AV may be for example a ridehail vehicle service, or a privately owned vehicle that is self-driving.

AV control software 208 receives data for example from speakers 230, cameras 236, 240, and other sensors as illustrated in FIG. 1. AV control software 208 may use AI, such as a deep learning (DL) model 224 to make control decisions for the AV. A single DL model 224 is illustrated in this figure, but in many embodiments multiple DL models are provided, and provide different functionality. In some cases, DL models 224 may be provided to enable not only the core AV control functionality, but to provide support functions such as those provided by onboard assistant 212.

AV controller 200 may also include a user interface 210. User interface 210 may be used for example to drive touchscreen 246, or to provide other interactions for a user, occupant, or passenger of the vehicle.

I/O drivers 220 may provide a software stack that enables communication between softer modules 202 and various hardware elements such as those illustrated for AV controller 200.

A network stack 216 may be provided to communicatively couple AV controller 200 to an external network such as the internet, an intranet, or some other data communication network. Network stack 216 may communicate via digital data transceiver 248. Network stack 216 may also provide services for cellular transceiver 244.

AV controller 200 may include an onboard assistant 212. Onboard assistant 212 may provide features that are useful to both the passenger of the AV, and an operator of the AV if different from the passenger. In the context of a ridehail vehicle, an onboard assistant 212 may help the passenger safely and effectively operate the vehicle.

AV controller 200 may include an emergency response module 228. Emergency response module 228 may handle a special case or subset of the functions of onboard assistant 212. Emergency response module 228 may specifically be concerned with handling emergency conditions such as a collision, mechanical failure, or other condition that poses a danger to the occupant or to the vehicle or both.

AV controller 200 may also include a natural language processing (NLP) engine 222, which may be used to understand verbal commands, queries, and other interactions with the passenger. For example, if the passenger speaks within the cab of the AV, then microphones 232 may pick up the voice, and NLP engine 222 may use ML (such as DL model 224) to transcribe the spoken word. NLP engine 222 may also use a ML model to attempt to understand what the passenger has said and formulate a response.

Text-to-speech engine 226 may translate the response into human perceptible speech patterns, which may be driven to speakers 230. Text-to-speech may provide real-time direct interaction between the passenger and the AV.

Figure 3:
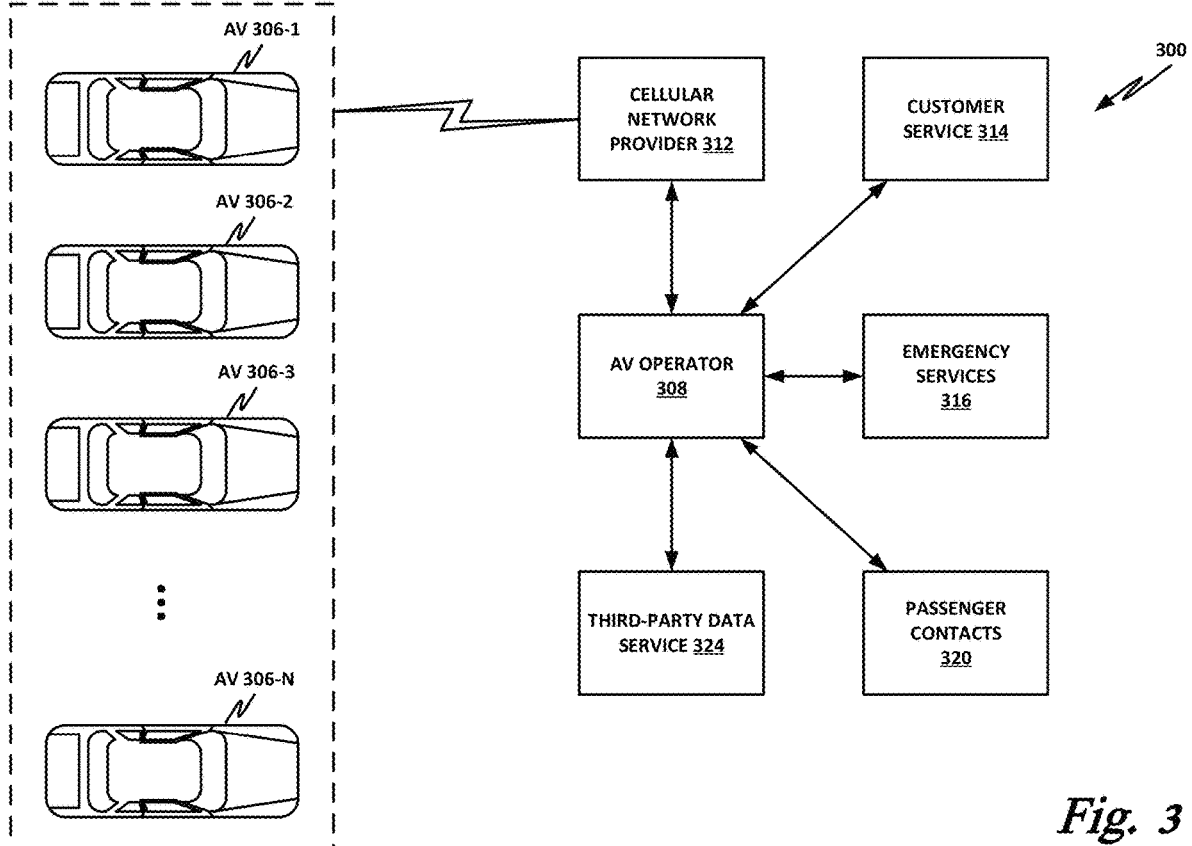
FIG. 3 is a block diagram of selected elements of an AV system.

FIG. 3 is a block diagram illustration of selected elements of an AV system 300. In this illustration, AV operator 308 may operate a fleet of AVs 306. Namely, illustrated here are AVs 306-1, 306-2, 306-3, through 306-N. AV operator 308 may include data centers, computer resources, electronic intelligence, and human operators including human customer service representatives. Human customer service representatives may have a user interface on which they may view AVs 306 within the fleet, including their GPS location, speed, destination, number of passengers, and other information. The user interface may be, for example, a graphical user interface (GUI), web interface, command line interface (CLI), textual user interface (TUI), virtual reality (VR) interface, augmented reality (AR) interface, or other.

In some cases, and AV 306 may encounter an event that triggers a response by an onboard assistant, such as onboard assistant 212 of FIG. 2. Triggering events may include emergency or non-emergency events. For example, a triggering event that activates the onboard assistant may include a passenger pressing a hardware or software button, which initiates a call with the AV operator. In another example, a user asks a simple question. In that case, the onboard assistant may autonomously answer the question and the interaction may stay local within the AV 306.

In cases where further intervention is required, AVs 306 may place a call via cellular network 312 to AV operator 308. Cellular network 312 may then provide a voice link between the AV 306, the passenger, and AV operator 308. In some cases, the call is initially placed as a conference call with the AV operator in control of the conference call. The use of a conference call may enable AV operator 308 to manage the call, to add or remove parties as necessary, and to otherwise maintain contact with AV 306 and the passenger without interruption. In some cases, establishing the call as a conference call initially means that the passenger need not be placed on hold if AV operator 308 needs to involve other parties. For example, AV operator 308 may connect to a customer service team 314. The team may be, for example, an internal customer service team, or an outside customer service contractor. Customer service 314 may help to resolve complaints, concerns, feedback (positive or negative), questions, or other customer service issues.

In some cases a third-party data service 324 may provide information to AV operator 308 and/or customer service 314. For example, the passenger may book a ride with a ridehail vehicle via a ridehail app. The app may include a user account, wherein the customer ops to provide to provide and share certain information with AV operator 308. The data may include personally identifying information (PII) about the passenger, a phonebook of contacts, an emergency contact, user preferences, common routes and destinations, or similar. AV operator 308 may share information from third-party data service 324 according to the terms of a license agreement, and according to a present need. For example if customer service 314 needs information from third-party data service 324, then AV operator 308 may provide the information to customer service 314.

In the case of an emergency, it may be necessary to provide other connections. For example AV operator 308 may communicate with emergency services 316 to dispatch emergency crews to a current location of AV 306 to assess the situation and to provide aid to the passenger as necessary. In some cases third-party data service 324 may include a list of known passenger contacts 320, or the passenger may use a mobile device such as a cell phone to share emergency contact with the onboard assistant. In the case of an emergency, AV operator 308 may contact an emergency contact on behalf of the passenger.

In other examples, the passenger may simply wish to place a call to one of his or her contacts, in which case AV operator 308 may connect the call and then, if appropriate, remove itself from the call so that there is a direct communication between the passenger and the passenger contact. In the same or a different embodiment, the onboard assistant may connect the passenger directly to a contact, without including AV operator 308.

As described above, the onboard assistant need not provide strictly emergency services. For example third-party data service 324 could also include a provider of games, movies, music, or other entertainment. AV operator 308 may stream entertainment content to an AV 306 via cellular network 312 or some other digital network.

In the same or a different embodiment, third-party data service 324 may also provide useful information such as weather reports, traffic reports, breaking news, incident reports, or other. For example, the onboard assistant may use information from third-party data service 324 to determine that adverse weather has made the planned route less desirable. As an illustration, the third-party data service may report a flash flood watch or flash flood warning, and the onboard assistant may determine that the planned route includes low water crossings. In that case, the onboard assistant may reroute to provide a better trip experience. The third-party data assistant may also provide information that could similarly be used to reroute to avoid construction, traffic, congestion, adverse conditions (e.g., civil unrest, a structural fire, a dangerous gas leak, etc.), or other conditions that affect the safety and/or desirability of the planned route.

AV operator 308 may also provide advice to the passenger in the event of other non-emergency situations that may nevertheless be stressful. For example if a police officer pulls over the ridehail vehicle, AV operator 308 may establish a call with an AV 306, and help the passenger to remain calm, answer questions for the passenger, or assist the passenger in interacting with the law enforcement official.

Other illustrative functions of an onboard assistant may be seen throughout this specification.

Figure 4:
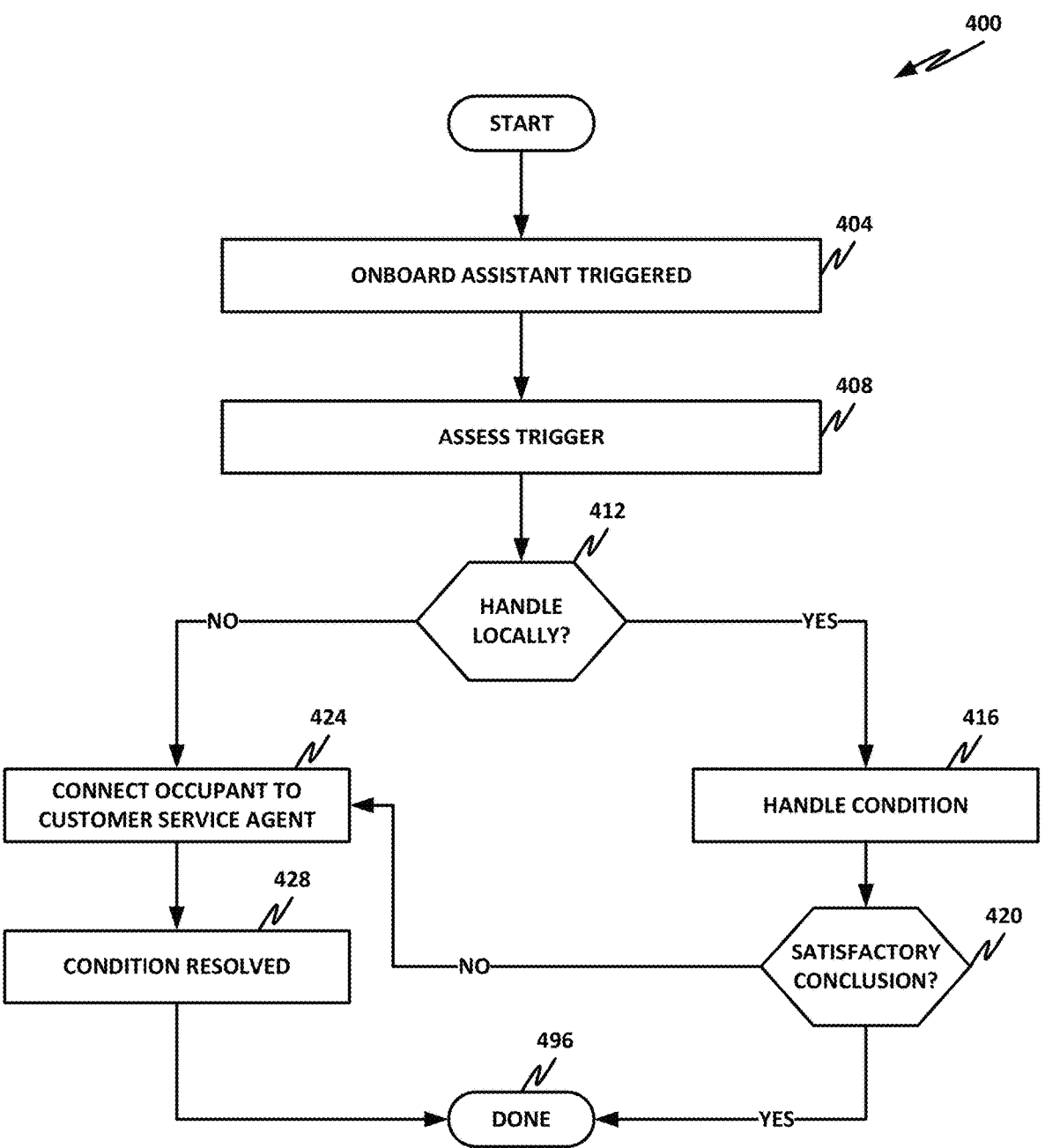
FIG. 4 is a flow chart of selected elements of a method of providing services via an onboard assistant.

FIG. 4 is a flowchart of method 400 of providing onboard assistance to a passenger oven AV.

In block 404, an appropriate event triggers the onboard assistant. As discussed above, this could be an emergency or non-emergency event. For example this may include a button push by the passenger, an accident, a law enforcement interaction, hazardous weather, civil unrest, a hazard, a customer service complaint, problematic behavior by the passenger, or other event.

In block 408, the onboard assistant may assess the trigger to determine the appropriate response. In particular, the onboard assistant may determine whether the incident is to be handled locally (e.g., by the AV controller) or remotely (e.g., by the AV operator and/or customer service).

In decision block 412, the onboard assistant decides whether to handle the interaction locally, according to the assessment of block 408. If the interaction is to be handled locally, then in block 416, the AV controller handles interaction. Local handling may include, for example, handling a user request to stream entertainment services, answering questions from the user, determining that the user has asked to be let off early, or performing some other function that the AV controller may handle on its own without outside intervention.

In decision block 420, the AV controller determines whether there was a satisfactory conclusion to the onboard assistance trigger, or whether additional action is necessary. If the interaction was successfully handled, then in block 496 the method is done.

Returning to decision block 420, if there was not a satisfactory conclusion, and if it is necessary to involve an outside agent, then control may pass to block 424.

Returning to decision block 412, if the interaction cannot be handled locally, then control passes to block 424. Within block 424, either because the AV controller initially decided not to handle the interaction locally, or because the AV controller was unable to satisfactorily conclude the interaction, the AV controller may communicatively couple to the AV operator, for example to customer service. Connecting to customer service may enable the occupant to talk with a human, or to interact with a device that has more capability than the onboard AV controller. Additional capability may include a customer service agent, or some other agent of the AV operator. In some cases, this may also include connecting to emergency services or other third parties, to ensure that the user receives timely assistance in the event of an emergency or non-emergency condition.

In block 428, the condition is resolved with the intervention of appropriate human or other actors.

In block 496, the method is done.

Figure 5:
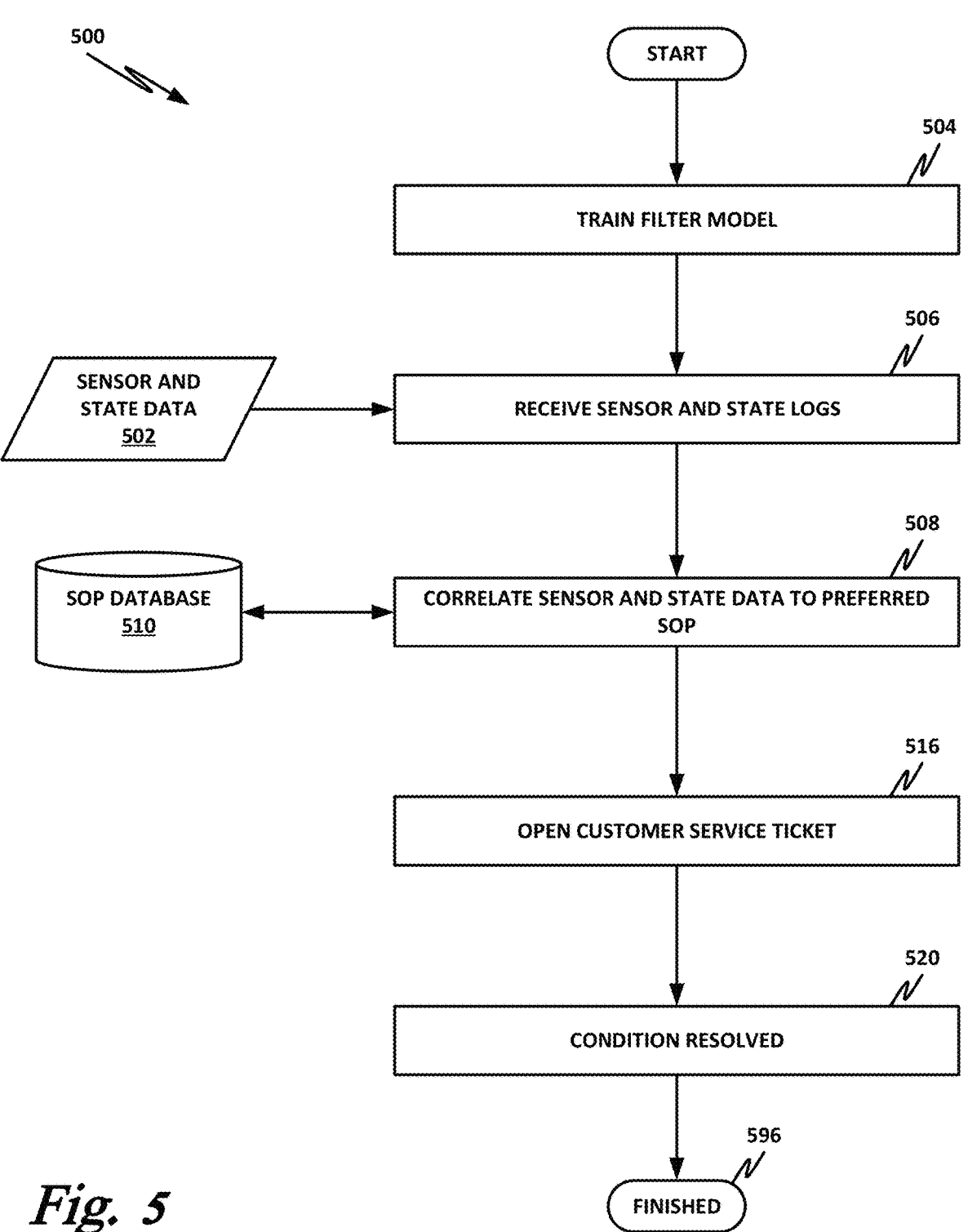
FIG. 5 is a flow chart of selected elements of a method of selecting a checklist for a customer service instance.

FIG. 5 is a flowchart of a method 500 of handling a customer service incident within AVs.

In block 504, the operator may train a filter model to appropriately filter and transform sensor inputs to provide useful inferences about a state of the vehicle. Training may include, for example, training the model on real or simulated sensor data, which may be used to infer filter thresholds, sensitivities, or other values. The filter model may be useful in automatically triggering calls via the onboard assistant. Alternatively, the onboard assistant may be expressly triggered by a passenger, such as the passenger pressing a button, issuing a voice command, or otherwise.

In block 506, the onboard assistant receives sensor and state logs/data 502. Sensor and state logs/data 502 may include data that affect a state of the vehicle, such as its performance, errors, emergency conditions, or others. Sensor and state logs/data 502 may also include sensor information collected about the passenger, such as via audio, video, infrared, or other sensors. These data may be useful, for example, in inferring the passenger's present stress state, health state, injuries, or other information that may be useful in performing a customer service function.

In block 508, a customer service function may correlate the sensor and state data to a preferred SOP for the situation. This correlation may include comparing sensor and state logs/data 502 to an SOP database 510. Optionally, correlation may include an ML algorithm that selects a preferred SOP according to the sensor and state data.

In block 516, the customer service function may open a customer service ticket to provide the requested and/or necessary aid to the passenger. Providing aid may include providing the selected SOP, and executing the SOP (or a part of the SOP) via machine instructions. Providing aid may also include providing the selected SOP (or a part thereof) as a script to a customer service agent to help the customer.

By way of illustrative example, an SOP may be established for the event of a detected collision. This SOP may include specific steps, organized to effect macro-scale goals, such as:

a. Ensure that the humans involved are safe.
   b. Dispatch emergency services to aid the humans.
   c. Assess the status of the vehicles involved.
   d. Dispatch services to support the vehicles.

An illustrative SOP for a collision may include the following steps. Other steps may be included, and some may be excluded where appropriate.

a. Sensors detect a collision, and report the collision to the AV operator.
   b. Open a conference call, using an embedded speaker phone for the AV occupant, and including for example a customer service agent (CSA) for the AV operator.
   c. CSA confirms that there has been a collision.
   d. CSA requests the occupant or occupants to self-report their condition.
   e. If an occupant is injured, add emergency services to the conference call, and request dispatch of emergency services. The CSA may also supplement with information about the collision derived from AV sensors.
   f. In the case of a two-vehicle collision, the CSA asks the occupants if they can see anything about the condition of the occupants of the other vehicle.
   g. As necessary, dispatch or request dispatch of additional emergency personnel.
   h. If the occupant or occupants are in a condition to continue providing information, CSA asks about the state of the vehicle.
   i. As appropriate or necessary, connect a vehicle support service to the conference call. CSA may request dispatch of a support vehicle (e.g., a tow truck, repair truck, or other) to provide support for the AV and/or other vehicle. The CSA may supplement with information derived from the AV sensors.
   j. If the occupant is uninjured and wishes to finish his or her trip, the CSA may dispatch a new ridehail vehicle to pick up the passenger and complete the trip.

In block 520, customer service may resolve the open ticket, for example according to the selected SOP.

Once the ticket is resolved, in block 596, the method is done.

Figure 6:
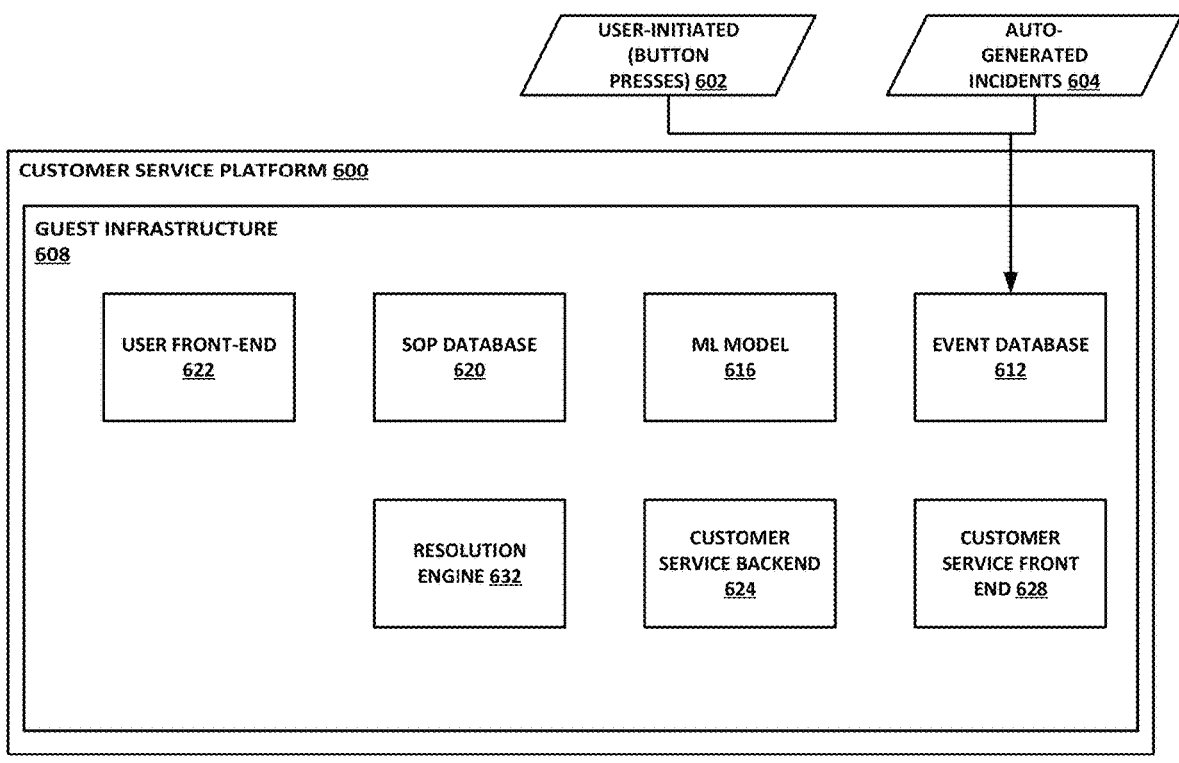
FIG. 6 is a block diagram of selected elements of a customer service platform.

FIG. 6 is a block diagram of selected elements of a customer service platform 600. Customer service platform 600 may be provided in a cloud or cloudlike environment, such as in a data center operating in a rack scale architecture. Customer service platform 600 may operate on a guest infrastructure 608, including, for example, a virtualization infrastructure or a containerization infrastructure by way of illustrative and non-limiting example.

Customer service platform 600 may receive user-initiated button presses 602, and auto-generated incidents 604 by way of illustrative example. The collected events may include sensor data that accompany the event. The inputs may be collected into an event database 612, which may associate button presses and automated events with their accompanying sensor data.

An ML model 616 may have access to an SOP database 620. SOP database 620 may include any number of SOPs or checklists to handle various types of customer service events or incidents. ML model 616 may use sensor data from within event database 612 to select a preferred SOP from SOP database 620. For example, sensor data may indicate, among other things, extremely low tire pressure corresponding to a flat tire. In that case, an SOP for handling a flat tire may be selected, and may include such steps as dispatching an emergency flat repair service, dispatching a replacement AV to finish the passenger's trip, and connecting a human customer service agent to the passenger to tell the passenger what is happening, ensure that the passenger is safe and comfortable, and answer any questions the passenger may have. In some cases, the SOP may also include suggested phraseology for the customer service agent to reassure and comfort the passenger as necessary.

Additional sensor data may be associated with the customer's sentiment or state of mind. For example, visual or audible cues may be used to infer customer sentiment, as well as thermal imaging or other data. A different SOP may be selected depending on whether the passenger is, for example, calm, agitated, or frightened. In the same or a different embodiment, new sensor data may be collected while the incident is in progress. If the new sensor data represent a change in condition (either for the AV or the passenger), then the new sensor data may be used to select a new SOP to handle the evolving situation. For example, if the passenger was previously calm, but begins to get agitated during the interaction, then a new SOP may be selected, and new options for helping the passenger may be presented to the customer service agent. In another example, if the condition of the AV changes, a new SOP may be selected. For example, if the heating system fails on a cold night while the passenger is waiting for a replacement AV, then a non-emergency incident may be elevated to an emergency incident.

User frontend 622 may include a user interface, such as a GUI, that may be displayed to the passenger, for example, via a tablet or other touchscreen on the AV. A tablet or touchscreen is used as an illustrative and non-limiting example, and other types of interfaces may be used. In another example, the passenger's own cell phone or mobile device may include a user interface that may interoperate with the AV.

A customer service backend 624 may provide backend data processing services to enhance the passenger customization experience. For example, this may include routing customer service tickets to a particular agent or team, providing suggestions on how to interact with a particular customer, dispatching ridehail vehicles, queuing ridehail vehicles for service, modifying trips, or performing other services. Customer service backend 624 may interact both with user frontend 622 and with a customer service frontend 628. Customer service frontend 628 may include an interface, such as a CLI, GUI, web interface, or other that customer service agents may access to perform their functions. For example, customer service backend 624 may visually, verbally, or textually communicatively couple customer service agents to the passenger.

Resolution engine 632 may include scripts or ML algorithms that may provide a method of resolving a customer service ticket. Algorithms may include automated services that may be performed by the AV or for the AV, or may include connecting the passenger to a customer service agent and optionally providing recommendations for helping the customer service agent to resolve the ticket. For example, if an AV encounters a flat tire, then sensors may notify customer service backend 624 of the change in tire pressure, from which a flat tire is inferred. The AV may stop so as not to cause damage to the vehicle, the occupants, or to third parties. Customer service backend 624 may query resolution engine 632 for a resolution to the situation, which may include an SOP selected from SOP database 620. The resolution may include several steps, such as for example, dispatching a service call to a contractor who provides flat tire services. The third-party contractor may go to the site, change the tire, or tow the AV as appropriate to respond to the situation.

In the meantime, a customer service agent may operate customer service frontend 628 to connect with the passenger optionally via a user frontend 622. The customer service agent may assure the passenger that help is on the way, may inform the passenger of why the AV has stopped, and may also remain on the line with the passenger to answer questions or resolve concerns. Furthermore, resolution engine 632 may identify a nearby ridehail vehicle that is suitable for the passenger. For example, this may include identifying a ridehail vehicle that has an appropriate number of seats for the passenger's party, or identifying a ridehail vehicle that is of a preferred color, configuration, or that is otherwise suitable for completing the passenger's trip. Resolution engine 632 may dispatch the new ridehail vehicle, which may proceed to the location of the stopped AV, pick up the passenger or passenger's party, and finish the trip.

Figure 7:
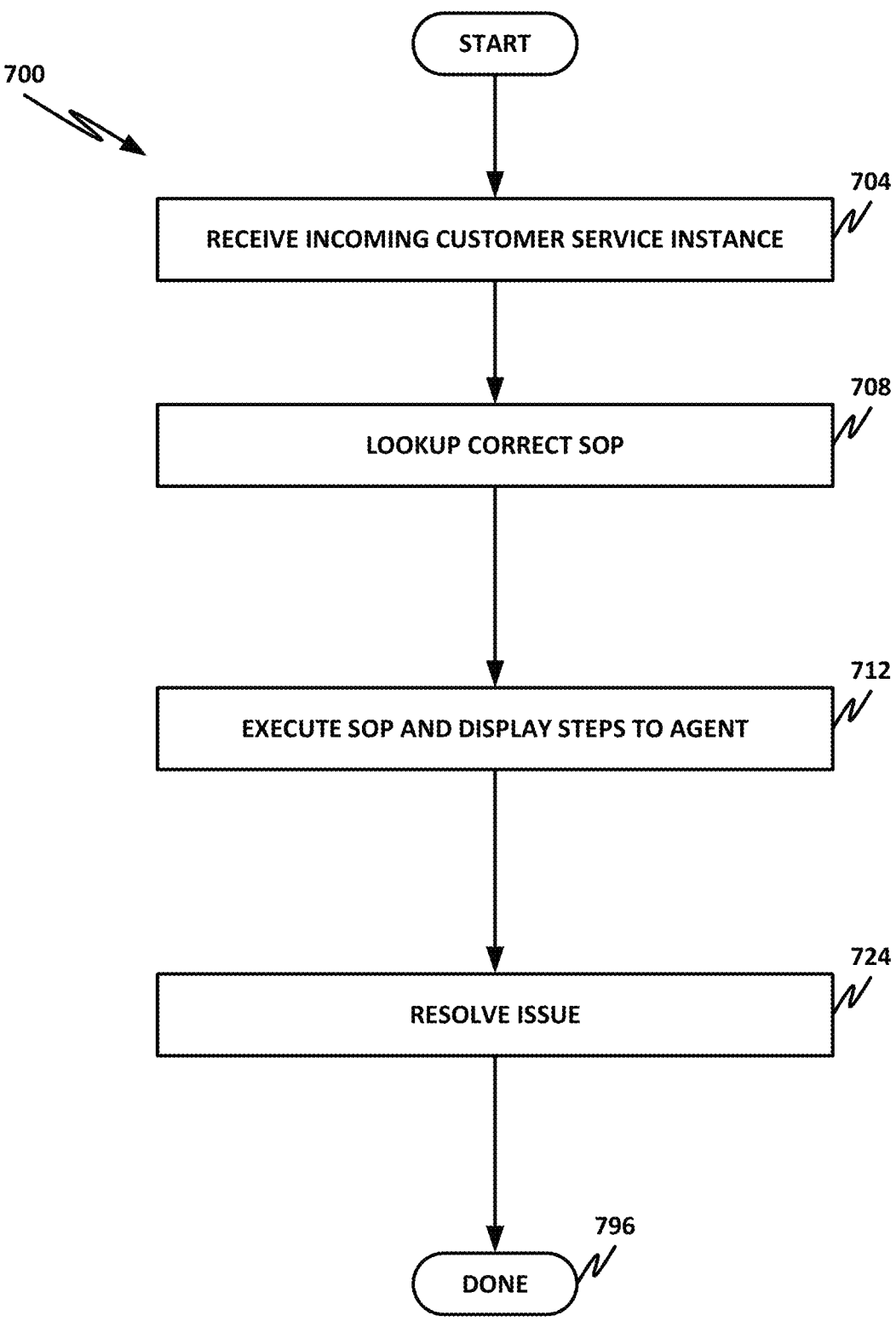
FIG. 7 is a flowchart of selected elements of a method of handling a customer service instance according to a selected checklist.

FIG. 7 is a flowchart of a method 700 that may be performed, for example, by a customer service platform, such as customer service platform 600 of FIG. 6.

Starting in block 704, the customer service platform may receive an incoming customer service instance. The incoming request may include a button press by the passenger expressly requesting contact with the customer service team, or it may include a data-driven event triggered by sensors on the AV. The incoming customer service instance may be accompanied by sensor data collected by the AV or from another source, such as from other AVs in an AV fleet, roadside sensors, closed-circuit television (CCTV) cameras, aerial drones, third-party data sources (e.g., news, traffic, and/or weather reports), or others.

In block 708, the customer service platform may look up a preferred SOP for the customer service incident. The lookup may include collecting the received sensor data and correlating the received sensor data to a database of a plurality of SOPs. In some embodiments, correlating may include using an ML algorithm such as a DL neural network In block 712, the customer service platform may carry out the selected SOP. Carrying out the SOP may include carrying out some steps automatically, such as by dispatching a different AV, dispatching emergency or non-emergency services, logging data, or other steps that may be carried out by a machine. Carrying out the SOP may also include displaying, to a customer service agent, appropriate steps for resolving the concern, and suggested phraseology or scripts for interacting with the customer. While performing the SOP, the system may also continue collecting data, and may switch to a different SOP in real-time or near real-time if something changes, such as a status of the AV or the passenger, or a customer sentiment.

In block 724, the issue is resolved, and the passenger may continue the trip or otherwise end the conversation.

In block 796, the method is done.

FIG. 8 is a block diagram of a hardware platform 800. Although a particular configuration is illustrated here, there are many different configurations of hardware platforms, and this embodiment is intended to represent the class of hardware platforms that may provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Hardware platform 800 may provide a suitable structure for controller 104 of FIG. 1, onboard assistant 212 of FIG. 2, as well as for other computing elements illustrated throughout this specification, including elements external to AV 102. Depending on the embodiment, elements of hardware platform 800 may be omitted, and other elements may be included.

Hardware platform 800 is configured to provide a computing device. In various embodiments, a "computing device" may be or comprise, by way of non-limiting example, a computer, system-on-a-chip (SoC), workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used. The PtP configuration may be an internal device bus that is separate from CAN bus 170 of FIG. 1, although in some embodiments they may interconnect with one another.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more central processor units (CPU).

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency nonvolatile memory. However, memory 804 and storage 850 need not be physically separate devices, and in some examples may simply represent a logical separation of function (if there is any separation at all). It should also be noted that although DMA is disclosed by way of non-limiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that may coordinate to achieve a logical operation.

Chipset 816 may be in communication with a bus 828 via an interface circuit. Bus 828 may have one or more devices that communicate over it, such as a bus bridge 832, I/O devices 835, accelerators 846, and communication devices 840, by way of non-limiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and non-limiting example.

Communication devices 840 may broadly include any communication not covered by a network interface and the various I/O devices described herein. Devices may include, for example, various universal serial bus (USB), FireWire, Lightning, or other serial or parallel devices that provide communications. In a particular example, communication device 840 may be used to stream and/or receive data within a CAN. For some use cases, data may be streamed using UDP, which is unidirectional and lacks error correction. UDP may be appropriate for cases where latency and overhead are at a higher premium than error correction. If bi-directional and/or error corrected communication are desired, then a different protocol, such as TCP may be preferred.

I/O devices 835 may be configured to interface with any auxiliary device that connects to hardware platform 800 but that is not necessarily a part of the core architecture of hardware platform 800. A peripheral may be operable to provide extended functionality to hardware platform 800 and may or may not be wholly dependent on hardware platform 800. In some cases, a peripheral may itself be a. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of non-limiting example.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), and/or accelerators 846. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). For real-time systems such as an AV, various forms of QNX are popular. In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

There are described throughout this specification various engines, modules, agents, servers, or functions. Each of these may include any combination of one or more logic elements of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of non-limiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language. These may be used with any compatible operating systems or operating environments. Hardware elements may be designed manually, or with a hardware description language. The source code may define and use various data structures and communication messages. The source code may be in a computer-executable form (e.g., via an interpreter), or the source code may be converted (e.g., via a translator, assembler, or compiler) into a computer-executable form, or converted to an intermediate form such as byte code. Where appropriate, any of the foregoing may be used to build or describe appropriate discrete or integrated circuits, whether sequential, combinatorial, state machines, or otherwise.

Communication devices 840 may communicatively couple hardware platform 800 to a wired or wireless network or fabric. A "network," as used throughout this specification, may include any communicative platform operable to exchange data or information within or between computing devices, including any of the protocols discussed in connection with FIG. 1 above. A network interface may include one or more physical ports that may couple to a cable (e.g., an Ethernet cable, other cable, or waveguide), or a wireless transceiver.

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all the functions of a physical hardware platform.

In a general sense, any suitably configured processor may execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a SoC architecture or in any other suitable configuration. For example, embodiments disclosed herein may be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

SELECTED EXAMPLES

Example 1 includes a method of providing customer service, comprising: receiving a customer service request from an autonomous vehicle (AV), the customer service request comprising sensor data collected by the AV; selecting a standard operating procedure (SOP) for responding to the customer service request, the SOP selected from a data store comprising a plurality of SOPs, wherein selecting the SOP is based at least in part on the sensor data from the AV, and wherein the SOP includes a human-usable resolution script; and handling the customer service request, comprising displaying the human-usable resolution script to a human customer service agent to assist the human customer service agent in handling the customer service request.

Example 2 includes the method of example 1, wherein the customer service request was initiated autonomously by the AV.

Example 3 includes the method of example 1, wherein the customer service request was initiated by a passenger of the AV.

Example 4 includes the method of example 3, wherein selecting the SOP comprises accounting for a user sentiment of the passenger.

Example 5 includes the method of example 4, further comprising using audio and/or video data to infer the user sentiment.

Example 6 includes the method of example 1, wherein selecting the SOP comprises mapping a root cause of the customer service request.

Example 7 includes the method of example 1, wherein the sensor data comprises a state of the AV.

Example 8 includes the method of example 1, wherein the sensor data comprises a state of a passenger of the AV.

Example 8 includes the method of example 1, wherein the sensor data comprise a state of a cabin of the AV.

Example 10 includes the method of example 1, wherein the sensor data comprise a state of a door or window of the AV.

Example 11 includes the method of example 1, wherein the sensor data comprise occupancy data.

Example 12 includes the method of example 1, wherein the sensor data comprise data from a third-party data source.

Example 13 includes the method of example 12, wherein the third-party data source comprises a third-party traffic service.

Example 14 includes the method of example 12, wherein the third-party data source comprises a third-party news service.

Example 15 includes the method of example 12, wherein the third-party data source comprises a third-party weather service.

Example 16 includes the method of example 12, wherein the third-party data source comprises a third-party traffic service.

Example 17 includes the method of example 12, wherein the third-party data source comprises closed-circuit television (CCTV) data.

Example 18 includes the method of example 12, wherein the third-party data source comprises data from a second AV that belongs to an AV fleet that the AV also belongs to.

Example 19 includes the method of example 1, wherein selecting the SOP comprises providing the sensor data to a machine learning (ML) algorithm, and selecting the SOP as an output of the ML algorithm.

Example 20 includes the method of example 19, further comprising training the ML algorithm with a plurality of real or simulated sensor data conditions and respective preferred SOPs for the real or simulated sensor data conditions.

Example 21 includes the method of example 20, wherein the ML algorithm is a deep learning (DL) neural network.

Example 22 includes the method of example 1, further comprising collecting additional data while handling the customer service request.

Example 23 includes the method of example 22, further comprising selecting a new SOP according to the additional data.

Example 24 includes the method of example 22, wherein the additional data comprise data that have changed since a beginning of handling the customer service request.

Example 25 includes the method of example 22, wherein the additional data comprise a passenger sentiment.

Example 26 includes the method of example 22, wherein the additional data comprise a change in customer sentiment since a beginning of handling the customer service request.

Example 27 includes the method of example 22, wherein the additional data comprise a change in status of the AV since a beginning of handling the customer service request.

Example 28 includes apparatus comprising means for performing the method of any of examples 1-27.

Example 29 includes the apparatus of example 28, wherein the means for performing the method comprise a processor and a memory.

Example 30 includes the apparatus of example 29, wherein the memory comprises machine-readable instructions that, when executed, cause the apparatus to perform the method of any of examples 1-27.

Example 31 includes the apparatus of any of examples 28-30, wherein the apparatus is a computing system.

Example 32 includes at least one computer-readable medium comprising instructions that, when executed, implement a method or realize an apparatus as illustrated in any of examples 1-31.

Example 33 includes a computing system comprising at least one processor circuit, and at least one memory; and instructions encoded on the at least one memory that, when executed, instruct the at least one processor circuit to: provide a user interface to a customer service agent (CSA); receive, from a fleet vehicle (preferably an autonomous vehicle), incident data collected by the fleet vehicle (preferably incident data comprising information collected by sensors of the autonomous vehicle); institute a customer service instance based on the incident data; select a standard operating procedure (SOP) based on the incident data, the SOP selected from a data store comprising a plurality of SOPs, wherein the SOP includes human-usable instructions; and display to the CSA the human-usable instructions via the user interface.

Example 34 includes the computing system of example 33, wherein the SOP further comprises computer-executable operations, and wherein the instructions are further to instruct the at least one processor circuit to carry out the computer-executable operations.

Example 35 includes the computing system of example 33, wherein the fleet vehicle is an autonomous vehicle (AV).

Example 36 includes the computing system of example 35, wherein the incident data comprise information that a vehicle controller of the fleet vehicle requested customer service support.

Example 37 includes the computing system of example 35, wherein the incident data comprise information that a passenger of the fleet vehicle requested customer service support.

Example 38 includes the computing system of example 37, wherein selecting the SOP comprises accounting for a user sentiment of the passenger.

Example 39 includes the computing system of example 38, further comprising using audio and/or video data to infer the user sentiment.

Example 40 includes the computing system of example 33, wherein selecting the SOP comprises mapping a root cause of the customer service instance.

Example 41 includes the computing system of example 33, wherein the incident data comprise a state of the fleet vehicle.

Example 42 includes the computing system of example 33, wherein the incident data comprises a state of a passenger of the fleet vehicle.

Example 43 includes the computing system of example 33, wherein the incident data comprise a state of a cabin of the fleet vehicle.

Example 44 includes the computing system of example 33, wherein the incident data comprise a state of a door or window of the fleet vehicle.

Example 45 includes the computing system of example 33, wherein the incident data comprise occupancy data.

Example 46 includes the computing system of example 33, wherein the incident data comprise data from a third-party data source.

Example 47 includes the computing system of example 46, wherein the third-party data source comprises a third-party traffic service.

Example 48 includes the computing system of example 46, wherein the third-party data source comprises a third-party news service.

Example 49 includes the computing system of example 46, wherein the third-party data source comprises a third-party weather service.

Example 50 includes the computing system of example 46, wherein the third-party data source comprises a third-party traffic service.

Example 51 includes the computing system of example 46, wherein the third-party data source comprises closed-circuit television (CCTV) data.

Example 52 includes the computing system of example 46, wherein the third-party data source comprises data from a second fleet vehicle that belongs to a same fleet as the fleet vehicle.

Example 53 includes the computing system of example 33, wherein selecting the SOP comprises providing the incident data to a machine learning (ML) algorithm, and selecting the SOP as an output of the ML algorithm.

Example 54 includes the computing system of example 53, further comprising training the ML algorithm with a plurality of real or simulated sensor data conditions and respective preferred SOPs for the real or simulated sensor data conditions.

Example 55 includes the computing system of example 54, wherein the ML algorithm is a deep learning (DL) neural network.

Example 56 includes the computing system of example 33, wherein the instructions are further to collect additional data while handling the customer service instance.

Example 57 includes the computing system of example 56, wherein the instructions are further to select a new SOP according to the additional data.

Example 58 includes the computing system of example 56, wherein the additional data comprise data that have changed since a beginning of handling the customer service instance.

Example 59 includes the computing system of example 56, wherein the additional data comprise a passenger sentiment.

Example 60 includes the computing system of example 56, wherein the additional data comprise a change in customer sentiment since a beginning of handling the customer service instance.

Example 61 includes the computing system of example 56, wherein the additional data comprise a change in status of the fleet vehicle since a beginning of handling the customer service instance.

Example 63 includes one or more tangible, non-transitory computer-readable media having stored thereon executable instructions to instruct a processor to: provide a user interface to a customer service agent (CSA); receive, from a fleet vehicle (preferably an autonomous vehicle), incident data collected by the fleet vehicle (preferably incident data comprising information collected by sensors of the autonomous vehicle); institute a customer service instance based on the incident data;

select a standard operating procedure (SOP) based on the incident data, the SOP selected from a data store comprising a plurality of SOPs, wherein the SOP includes human-usable instructions; and display to the CSA the human-usable instructions via the user interface.

Example 63 includes the one or more tangible, non-transitory computer-readable media of example 62, wherein the SOP further comprises computer-executable operations, and wherein the executable instructions are further to instruct the processor to carry out the computer-executable operations.

Example 64 includes the one or more tangible, non-transitory computer-readable media of example 62, wherein the fleet vehicle is an autonomous vehicle (AV).

Example 65 includes the one or more tangible, non-transitory computer-readable media of example 64, wherein the incident data comprise information that a vehicle controller of the fleet vehicle requested customer service support.

Example 66 includes the one or more tangible, non-transitory computer-readable media of example 64, wherein the incident data comprise information that a passenger of the fleet vehicle requested customer service support.

Example 67 includes the one or more tangible, non-transitory computer-readable media of example 66, wherein selecting the SOP comprises accounting for a user sentiment of the passenger.

Example 68 includes the one or more tangible, non-transitory computer-readable media of example 67, further comprising using audio and/or video data to infer the user sentiment.

Example 69 includes the one or more tangible, non-transitory computer-readable media of example 62, wherein selecting the SOP comprises mapping a root cause of the customer service instance.

Example 70 includes the one or more tangible, non-transitory computer-readable media of example 62, wherein the incident data comprise a state of the fleet vehicle.

Example 71 includes the one or more tangible, non-transitory computer-readable media of example 62, wherein the incident data comprises a state of a passenger of the fleet vehicle.

Example 72 includes the one or more tangible, non-transitory computer-readable media of example 62, wherein the incident data comprise a state of a cabin of the fleet vehicle.

Example 73 includes the one or more tangible, non-transitory computer-readable media of example 62, wherein the incident data comprise a state of a door or window of the fleet vehicle.

Example 74 includes the one or more tangible, non-transitory computer-readable media of example 62, wherein the incident data comprise occupancy data.

Example 75 includes the one or more tangible, non-transitory computer-readable media of example 62, wherein the incident data comprise data from a third-party data source.

Example 76 includes the one or more tangible, non-transitory computer-readable media of example 75, wherein the third-party data source comprises a third-party traffic service.

Example 77 includes the one or more tangible, non-transitory computer-readable media of example 75, wherein the third-party data source comprises a third-party news service.

Example 78 includes the one or more tangible, non-transitory computer-readable media of example 75, wherein the third-party data source comprises a third-party weather service.

Example 79 includes the one or more tangible, non-transitory computer-readable media of example 75, wherein the third-party data source comprises a third-party traffic service.

Example 80 includes the one or more tangible, non-transitory computer-readable media of example 75, wherein the third-party data source comprises closed-circuit television (CCTV) data.

Example 81 includes the one or more tangible, non-transitory computer-readable media of example 75, wherein the third-party data source comprises data from a second fleet vehicle that belongs to a same fleet as the fleet vehicle.

Example 82 includes the one or more tangible, non-transitory computer-readable media of example 62, wherein selecting the SOP comprises providing the incident data to a machine learning (ML) algorithm, and selecting the SOP as an output of the ML algorithm.

Example 83 includes the 3one or more tangible, non-transitory computer-readable media of example 82, further comprising training the ML algorithm with a plurality of real or simulated sensor data conditions and respective preferred SOPs for the real or simulated sensor data conditions.

Example 84 includes the one or more tangible, non-transitory computer-readable media of example 83, wherein the ML algorithm is a deep learning (DL) neural network.

Example 85 includes the one or more tangible, non-transitory computer-readable media of example 62, wherein the executable instructions are further to collect additional data while handling the customer service instance.

Example 86 includes the one or more tangible, non-transitory computer-readable media of example 85, wherein the executable instructions are further to select a new SOP according to the additional data.

Example 87 includes the one or more tangible, non-transitory computer-readable media of example 86, wherein the additional data comprise data that have changed since a beginning of handling the customer service instance.

Example 88 includes the one or more tangible, non-transitory computer-readable media of example 86, wherein the additional data comprise a passenger sentiment.

Example 89 includes the one or more tangible, non-transitory computer-readable media of example 86, wherein the additional data comprise a change in customer sentiment since a beginning of handling the customer service instance.

Example 90 includes the one or more tangible, non-transitory computer-readable media of example 86, wherein the additional data comprise a change in status of the fleet vehicle since a beginning of handling the customer service instance.

Variations and Implementations

As will be appreciated by one skilled in the art, aspects of the present disclosure, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system." In at least some cases, a "circuit" may include both the physical hardware of the circuit, and any hardware or firmware that programs or configures the circuit. For example, a network circuit may include the physical network interface circuitry, as well as the logic (software and firmware) that provides the functions of a network stack.

Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The foregoing detailed description presents various descriptions of specific certain embodiments. However, the innovations described herein may be embodied in a multitude of different ways, for example, as defined and covered by the claims and/or select examples. In the following description, reference is made to the drawings where like reference numerals may indicate identical or functionally similar elements. It will be understood that elements illustrated in the drawings are not necessarily drawn to scale. Moreover, it will be understood that certain embodiments may include more elements than illustrated in a drawing and/or a subset of the elements illustrated in a drawing. Further, some embodiments may incorporate any suitable combination of features from two or more drawings.

The preceding disclosure describes various illustrative embodiments and examples for implementing the features and functionality of the present disclosure. While components, arrangements, and/or features are described below in connection with various example embodiments, these are merely examples used to simplify the present disclosure and are not intended to be limiting.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The "means for" in these instances (above) may include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What is claimed is:

1. A method of providing customer service, comprising:
  receiving, by an electronic autonomous vehicle (AV) operator, a customer service (CS) request from an AV, the CS request comprising first sensor data collected by the AV;
  mapping, by the electronic AV operator, the CS request to a cause, and a first standard operating procedure (SOP) for responding to the CS request, wherein the first SOP includes a first human-usable resolution script wherein mapping the first SOP comprises accounting for a user sentiment of a passenger of the AV based on the first sensor data, including camera data and microphone data, wherein mapping the first SOP further comprises providing the first sensor data to a machine learning (ML) algorithm, and selecting the first SOP as an output of the ML algorithm;
  displaying, by the electronic AV operator, the first human-usable resolution script and cause to a human CS agent to assist the human CS agent in handling the CS request
  after displaying the first human-usable resolution script, receiving, by the electronic AV operator, second sensor data collected by the AV subsequent to the first sensor data;
  based on the second sensor data, determining, by the electronic AV operator, a change in condition of the AV, the change in condition comprising at least one of a change in AV operational state or a change in the user sentiment;
  based on determining the change in condition of the AV, selecting, by the electronic AV operator using the ML algorithm, a second SOP comprising a data structure linking a second human-usable resolution script to a set of computer-executable instructions corresponding to the determined change in condition; and
  updating, by the electronic AV operator, the display for the human CS agent to replace the first human-usable resolution script with the second human-usable resolution script corresponding to the second SOP; and
  transmitting, by the electronic AV operator to the AV, a command derived from the set of machine instructions of the second SOP to modify an operational state of the AV relevant to the determined change in condition, wherein modifying the operational state comprises one of:

dispatching a replacement AV to a location of the AV;

dispatching a support vehicle to the location of the AV; or rerouting the AV to avoid a hazard.

2. The method of claim 1, further comprising training the ML algorithm with a plurality of real and simulated sensor data conditions and respective preferred SOPs for the real and simulated sensor data conditions.

3. The method of claim 2, wherein the ML algorithm is a deep learning (DL) neural network.

4. The method of claim 1, wherein the change in condition of the AV is based on thermal imaging data.

5. The method of claim 4, wherein the second human-usable resolution script comprises suggested phraseology tailored to address the user sentiment inferred from the thermal imaging data.

6. The method of claim 4, wherein the thermal imaging data indicates a passenger body temperature metric crossing a predefined threshold.

7. The method of claim 4, wherein the change in condition comprises a change in AV operational state.

8. The method of claim 4, wherein the change in condition comprises a change in the user sentiment.

9. The method of claim 1, wherein the ML algorithm is trained on sets of sensor inputs along with a correct SOP selected for each set of sensor inputs, wherein the sets of sensor inputs comprise at least one set of real world sensor data and at least one set of simulated sensor data.

10. The method of claim 1, wherein the first sensor data includes infrared data for use in accounting for the user sentiment of the passenger for selecting the first SOP.

11. The method of claim 1, wherein the first SOP includes a set of steps for achieving a set of goals.

12. A computing system comprising:

at least one processor circuit, and at least one memory; and instructions encoded on the at least one memory that, when executed, instruct the at least one processor circuit to:

receive a customer service request comprising first sensor data collected by an autonomous vehicle (AV);

map the CS request to a cause, and a first standard operating procedure (SOP) for responding to the CS request, wherein the first SOP includes a first human-usable resolution script wherein mapping the first SOP comprises accounting for a user sentiment of a passenger of the AV based on the first sensor data, including camera data and microphone data, wherein mapping the first SOP further comprises providing the first sensor data to a machine learning (ML) algorithm, and selecting the first SOP as an output of the ML algorithm;

display the first human-usable resolution script and cause to a human CS agent to assist the human CS agent in handling the CS request after displaying the first human-usable resolution script, receive second sensor data collected by the AV subsequent to the first sensor data;

based on the second sensor data, determine a change in condition of the AV, the change in condition comprising at least one of a change in AV operational state or a change in the user sentiment;

based on determining the change in condition of the AV, select, using the ML algorithm, a second SOP comprising a data structure linking a second human-usable resolution script to a set of computer-executable instructions corresponding to the determined change in condition; and update the display for the human CS agent to replace the first human-usable resolution script with the second human-usable resolution script corresponding to the second SOP; and transmit a command derived from the set of machine instructions of the second SOP to modify an operational state of the AV relevant to the determined change in condition, wherein modifying the operational state comprises one of:

dispatching a replacement AV to a location of the AV;

dispatching a support vehicle to the location of the AV; or rerouting the AV to avoid a hazard.

13. The computing system of claim 12, wherein the instructions are further to train the ML algorithm with a plurality of real and simulated sensor data conditions and respective preferred SOPs for the real and simulated sensor data conditions.

14. The computing system of claim 13, wherein the ML algorithm is a deep learning (DL) neural network.

15. The computing system of claim 12, wherein the change in condition of the AV is based on thermal imaging data.

16. The computing system of claim 15, wherein the second human-usable resolution script comprises suggested phraseology tailored to address the user sentiment inferred from the thermal imaging data.

17. The computing system of claim 15, wherein the thermal imaging data indicates a passenger body temperature metric crossing a predefined threshold.

18. One or more tangible, non-transitory computer-readable media having stored thereon executable instructions to instruct a processor to:

receive a customer service request comprising first sensor data collected by an autonomous vehicle (AV);

map the CS request to a cause, and a first standard operating procedure (SOP) for responding to the CS request, wherein the first SOP includes a first human-usable resolution script wherein mapping the first SOP comprises accounting for a user sentiment of a passenger of the AV based on the first sensor data, including camera data and microphone data, wherein mapping the first SOP further comprises providing the first sensor data to a machine learning (ML) algorithm, and selecting the first SOP as an output of the ML algorithm;

display the first human-usable resolution script and cause to a human CS agent to assist the human CS agent in handling the CS request after displaying the first human-usable resolution script, receive second sensor data collected by the AV subsequent to the first sensor data;

based on the second sensor data, determine a change in condition of the AV, the change in condition comprising at least one of a change in AV operational state or a change in the user sentiment;

based on determining the change in condition of the AV, select, using the ML algorithm, a second SOP comprising a data structure linking a second human-usable resolution script to a set of computer-executable instructions corresponding to the determined change in condition; and update the display for the human CS agent to replace the first human-usable resolution script with the second human-usable resolution script corresponding to the second SOP; and transmit a command derived from the set of machine instructions of the second SOP to modify an operational state of the AV relevant to the determined change in condition wherein modifying the operational state comprises one of:

dispatching a replacement AV to a location of the AV;

dispatching a support vehicle to the location of the AV;

or rerouting the AV to avoid a hazard.

\* \* \* \* \*